United States Patent
Laurent et al.

(10) Patent No.: US 7,763,233 B2
(45) Date of Patent: Jul. 27, 2010

(54) HYDROGEN GENERATOR AND FUEL CELL USING SAME

(75) Inventors: Jean-Yves Laurent, Domene (FR); Frédéric Gaillard, Voiron (FR); Philippe Capron, Luzinay (FR); Denis Locatelli, Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 228 days.

(21) Appl. No.: 12/109,595

(22) Filed: Apr. 25, 2008

(65) Prior Publication Data

US 2009/0017346 A1 Jan. 15, 2009

Related U.S. Application Data

(63) Continuation of application No. PCT/FR2006/051221, filed on Nov. 23, 2006.

(30) Foreign Application Priority Data

Nov. 24, 2005 (FR) .................................. 05 53587

(51) Int. Cl.
*C01B 3/02* (2006.01)
*C01B 3/00* (2006.01)
*C01B 3/06* (2006.01)
*C01B 3/04* (2006.01)
*C01B 3/08* (2006.01)
*B01J 7/00* (2006.01)
*B01J 7/02* (2006.01)
*H01M 8/06* (2006.01)

(52) U.S. Cl. ................ 423/657; 422/264; 422/292; 422/305; 429/12; 423/658; 423/658.2; 48/61

(58) Field of Classification Search ............. 48/61; 423/657–658.2; 429/12; 422/264, 292, 305
See application file for complete search history.

(56) References Cited

U.S. PATENT DOCUMENTS

| | | | |
|---|---|---|---|
| 4,261,955 A | 4/1981 | Bailey, Jr. et al. | |
| 4,261,956 A | 4/1981 | Adlhart et al. | |
| 4,373,341 A * | 2/1983 | Mahaffy et al. | ............. 60/721 |
| 2001/0045364 A1 | 11/2001 | Hockaday et al. | |
| 2002/0182459 A1 | 12/2002 | Hockaday et al. | |
| 2004/0035054 A1 * | 2/2004 | Mohring et al. | ............. 48/61 |

FOREIGN PATENT DOCUMENTS

| | | |
|---|---|---|
| WO | 02/30810 A1 | 4/2002 |
| WO | 2005/005311 A2 | 1/2005 |
| WO | 2005/102914 A2 | 11/2005 |

* cited by examiner

*Primary Examiner*—David M. Brunsman
*Assistant Examiner*—Kevin M Johnson
(74) *Attorney, Agent, or Firm*—Burr & Brown

(57) ABSTRACT

A device for generating hydrogen by hydrolysis of a hydride comprising a reactor containing the hydride in solid form, in the divided state or not, and comprising at least one orifice for removing the hydrogen produced; means for releasing the water required for the hydrolysis reaction; and at least one envelope suitable for isolating the hydride from the water required for the hydrolysis reaction, the envelope being made from a consumable material. According to the present invention, the envelope is suitable for contacting the water with the hydride in a site capable of serving as the seat of the hydrolysis reaction and of moving in the reactor as the material constituting the envelope is consumed by the hydrolysis reaction products.

15 Claims, 3 Drawing Sheets

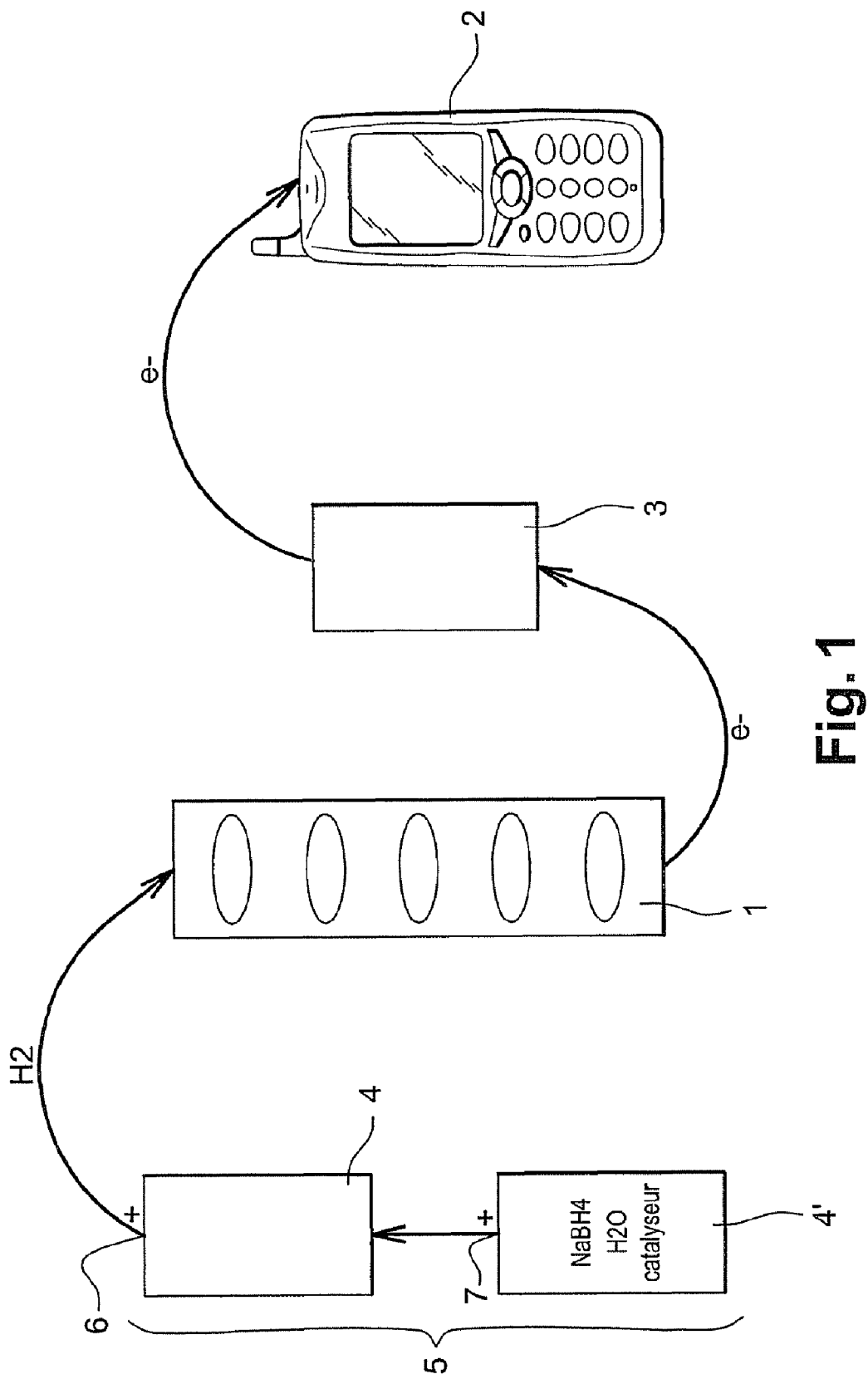

HYDROGEN GENERATOR AND FUEL CELL USING SAME

FIELD OF THE INVENTION

The present invention relates to the preparation of hydrogen generating devices, in particular for generating hydrogen gas. In a manner known per se, this production can be achieved by the hydrolysis of a borohydride.

This invention has an application in particular as a generator for fuel cells of the Proton Exchange Membrane Fuel Cells (PEMFC) type. More particularly, in the context of this application, the present invention relates to fuel cells for supplying electricity to portable electric or electronic devices, that is, devices requiring low electric power. However, this invention can find applications for supplying hydrogen to higher capacity fuel cells.

BACKGROUND OF THE INVENTION

Fuel cells represent a non-polluting and alternative energy source to hydrocarbon combustion, particularly for motor vehicles. A fuel cell is a battery in which the electricity is generated by the oxidation of a reducing fuel, for example hydrogen, on an electrode, coupled with the reduction of an oxidizer, such as oxygen in the air, on the other electrode. The hydrogen oxidation reaction can be accelerated by using a catalyst which generally contains a metallic element.

However, in the case of fuel cells using hydrogen, an extremely inflammable product, one of the main obstacles is the production and/or storage of this fuel. This is why technological decisions today tend to favour liquid fuels that are directly oxidized at the anode of the cell, or liquid or solid fuels capable of generating hydrogen "as required", that is, whereby the quantity of hydrogen generated equals the quantity of hydrogen consumed by the cell.

One of the known methods for producing hydrogen is to hydrolyze borohydrides in solid form, like sodium borohydride or tetrahydroborate $NaBH_4$, dissolved and contacted with a solid catalyst material. The sodium borohydride is hydrolyzed under certain conditions by the following reaction:

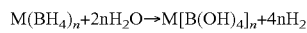

where M is an alkali or alkaline earth element and n is a positive whole number equal to the number of valency electrons of the element M. The element M may for example be sodium (Na), in which case the number n is 1, giving rise to the following reaction:

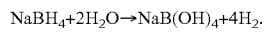

However, the element M may be potassium (K), lithium (Li) or another appropriate element.

This borohydride hydrolysis reaction has the advantage of involving reagents and residues which are harmless, that is, non-toxic and non-polluting, as opposed for example to the reactions occurring in the Direct Methanol Fuel Cell (DMFC) or Formic Acid Fuel Cell (FAFC) fuel cells, which use methanol and formic acid respectively as fuel.

According to this reaction scheme, the commonly used sodium borohydride generates four moles of hydrogen by reacting with two moles of water.

In order to improve the yield of the hydrolysis reaction, some prior art reactors use borohydrides in solid form, for example in the divided state, that is in powder form. The hydrogen is then generated by contacting the solid borohydride with an aqueous solution preferably containing a catalyst material.

However, this type of hydrogen generator has drawbacks which complicate its use. It is difficult to control the reaction between the solid borohydride and an aqueous solution, and hence the flow of hydrogen generated.

In fact, this heterogeneous reaction, that is involving reagents in the liquid and solid states, is difficult to control, because it requires mechanisms for diffusing the water towards the borohydride.

These diffusion mechanisms depend strongly on the porosity of the reaction medium, which varies with the advancement of the hydrolysis reaction because of the formation of more or less compact by-products. This makes it difficult to control the kinetics of the hydrolysis reaction in the case of the devices described by documents US-2002-182459, WO-A-2005/102914, U.S. Pat. No. 4,261,956, U.S. Pat. No. 4,261,955, which provide for contacting the reagents by diffusion across a porous membrane. Such a membrane is in fact subject to obstruction by the compact reaction products, such as the compound $NaB(OH)_4$.

Furthermore, these reaction by-products frequently obstruct the water intake line in the reactor containing the solid borohydride. In consequence, the reaction kinetics is liable to fluctuate according to the extent of this obstruction of the water intake. To avoid the addition of heavy and costly equipment to solve this problem, it is necessary to optimize the hydrogen generation by maximum control of the reaction.

Documents WO02/30810 and US2001/045364 also describe hydrogen generators in which the hydrolysis reactions are inaccurately controlled, because the reagents are contacted at several points, so that the reactions are all initiated and take place almost simultaneously over a large reaction exchange area.

SUMMARY OF THE INVENTION

The object of the present invention is to provide a hydrogen generator that does not have the drawbacks of the prior art. The subject of the present invention is therefore a device for generating hydrogen by hydrolysis of a hydride, allowing better control of the reaction kinetics, and hence the flow of hydrogen generated, while avoiding the risks of obstruction of the water intake.

The present invention thus relates to a device for generating hydrogen by hydrolysis of a hydride comprising:
- a reactor containing the hydride in solid form, in the divided state or not, and comprising at least one orifice for removing the hydrogen produced;
- means for releasing the water required for the hydrolysis reaction;
- at least one envelope suitable for isolating the hydride from the water required for the hydrolysis reaction, the envelope being made from a consumable material.

According to the invention, the envelope is suitable for contacting the water with the hydride in a site capable of serving as the seat of the hydrolysis reaction and of moving in the reactor as the material constituting the envelope is consumed by the hydrolysis reaction products.

In other words, a consumable material, that is soluble or dispersible, temporarily protects the hydride by separating it from the water, the consumable material then disappearing during the reaction. In the context of the present invention, envelope means one (or more) material(s) surrounding and covering one of the reagents. This definition therefore pertains directly to the common meaning of the term "envelope."

According to a first embodiment of the invention, the reactor further comprises at least one orifice that coincides with a line formed by the envelope to convey the water into the reactor.

In other words, the water intake line is inserted into the reactor and is dissolved by the hydrolysis reaction products as the hydride is consumed; this pipe is therefore shortened as this reaction advances.

According to a second embodiment of the invention, the reactor contains the quantity of water necessary to hydrolyze all the hydride that it contains. This water is separated from the hydride by the envelope made from a consumable material. However, this envelope does not contain the water but the hydride, and moreover, before any use of the device, it is mainly covered with a lining made from a material that is dispersible but not soluble in the water. In other words, the lining impermeabilizes the immersed envelope and protects it from premature dissolution.

In practice, this envelope may have the shape of a cylinder or a cone, having a circular or polygonal base. Such shapes are suitable for forming a water intake at controlled flow rate and for predicting the consumption time of the envelope having such a predefined shape. These shapes therefore serve to accurately control the hydrogen flow.

According to a particular embodiment of the invention, the hydrogen generator has a plurality of envelopes, having a similar or dissimilar geometry, and distributed in the reactor. This serves to even further improve the control of the hydrolysis reaction by increasing the number of water inlets at controlled flow rate in the reactor.

Advantageously, the hydride is selected from the group comprising sodium tetrahydroborate ($NaBH_4$), magnesium tetrahydroborate ($Mg(BH_4)_2$) and lithium hydride (LiH). These three compounds produce non-polluting reaction residues. They have a high hydrogen generating capacity. Sodium tetrahydroborate $NaBH_4$ is also the most advantageous, because it is easy to produce and inexpensive.

The hydride may also be selected from the group comprising $LiBH_4$, $Al(BH_4)_3$, $Be(BH_4)_2$, $MgH_2$, $CaH_2$, $Ca(AlH_4)_2$, $Zr(BH_4)_3$, $Ca(BH_4)_2$, $NaAlH_4$, $KBH_4$, $LiAlH_4$.

In practice, the consumable material constituting the envelope of the invention may be made from a metallic material that corrodes or an organic material that is degraded in the presence of a basic medium. Thus, during the hydrolysis of the hydride, this material is consumed due to the concomitant generation of hydroxide ions.

This organic material may be selected from polyamides, polycarbonates, PET (polyethylene terephthalate), polyesters, PVDF (polyvinylidene fluoride), PBT (polybutyl terephthalate).

Advantageously, this material may be a material whereof the dissolution under the action of the reaction products also produces hydrogen. This second hydrogen production reaction increases the total quantity of hydrogen produced in the reactor, thereby serving to improve the ratio of hydrogen produced to the weight of the generator.

In practice, this material may be aluminium or an aluminium alloy. Aluminum is in fact corroded by the hydroxide ions produced by the hydrolysis reaction, thereby producing hydrogen and alumina by the following reaction:

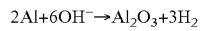

$$2Al + 6OH^- \rightarrow Al_2O_3 + 3H_2$$

Besides the generation of additional hydrogen, this reaction has the advantage of lowering the pH by consuming hydroxide ions, which would slow down the main hydride hydrolysis reaction.

According to a particular embodiment of the invention, a catalyst is introduced into the reactor in the form of a salt dissolved in the water or in the form of solid particles distributed in the hydride. This catalyst serves to increase the yield of the reaction, and its direct addition in one of the reagents present avoids its specific introduction into the reactor, thereby simplifying the use of the generator.

In particular, the element constituting this catalyst may be selected from the group comprising ruthenium (Ru), platinum (Pt), cobalt (Co), palladium (Pd), nickel (Ni), iron (Fe), gold (Au), silver (Ag), manganese (Mn), rhenium (Re), rhodium (Rh), titanium (Ti), vanadium (V) and cerium (Ce). If one or more of these metals is used to form the catalyst particles, it is possible to reach good reaction yields for generating hydrogen by the hydrolysis of a hydride.

According to a practical embodiment of the invention, the quantities of hydride and water in the reactor are selected and the envelope characteristic of the invention is dimensioned in order to produce a predefined hydrogen flow rate.

The present invention also relates to a fuel cell comprising an electrolyte, an anode and a cathode, whereof the oxidizer is oxygen ($O_2$), and the reducing agent is hydrogen ($H_2$) produced by hydrolysis. According to the invention, it comprises a device for generating hydrogen by hydrolysis of a hydride, as previously described.

The invention will appear more clearly in light of the description of the following particular embodiments. However, the object of the invention is not limited to these particular embodiments, and other embodiments of the invention are feasible.

BRIEF DESCRIPTION OF THE DRAWINGS

FIG. 1 is a schematic representation of a system comprising a fuel cell for powering a portable electronic device.

DETAILED DESCRIPTION OF THE INVENTION

Figure 2A:
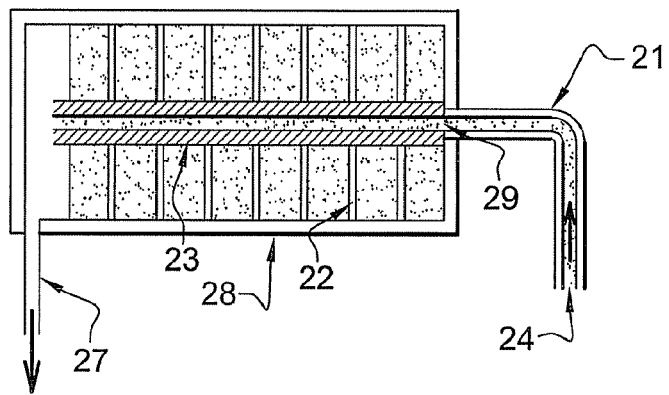
FIGS. 2a, 2b and 2c are schematic representations of various states of a device according to a first embodiment of the invention.

FIG. 1 therefore illustrates a schematic representation of a system comprising a fuel cell 1—subject matter of the invention—for powering a portable electronic device, in this case a mobile telephone 2. The power supply is provided via a battery 3 called buffer battery, suitable for stabilizing the electric current delivered to the mobile telephone 2. The fuel cell 1 conventionally comprises an electrolyte, an anode and a cathode. It uses oxygen gas ($O_2$) as oxidizer and, as reducing agent, hydrogen gas ($H_2$) produced using a generator 5 according to the present invention. The cell thus described may in particular supply power to low power devices, that is, typically requiring between 1 W and 100 W.

In the example in FIG. 1, the generator 5 comprises a fuel reserve 4' which is connected, via a quick coupling having two matching parts 6 and 7, in an appropriate housing 4 provided in the cell 1.

Figure 2B:
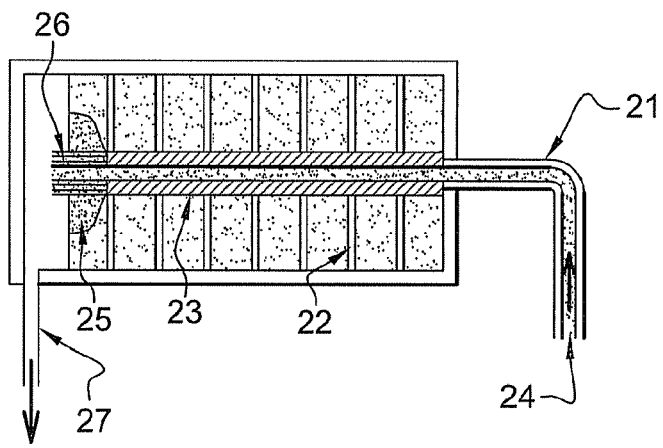
Figure 2C:
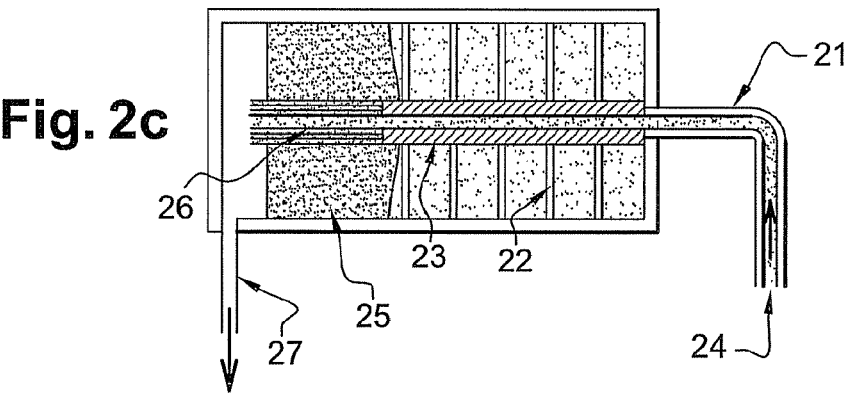

FIGS. 2a to 2c illustrate a first embodiment of the invention. According to this embodiment, the generator comprises a reactor 28, whereof the body houses the seat of the hydrogen production reaction. This body of the reactor 28 has an orifice 27 for allowing the removal of the hydrogen gas produced. A line for transporting the hydrogen to the fuel cell 1 can be mounted on this orifice 27.

The body of the reactor 28 contains sodium borohydride 22 in solid form in the state of an aggregate powder. The sodium borohydride $NaBH_4$ occupies most of the volume of the reactor body 28, here, leaving unobstructed the orifice 27 for removing the hydrogen produced by the hydrolysis reaction.

It is also possible, without going beyond the scope of the invention, to use a borohydride of another alkali or alkaline earth element, such as magnesium (Mg) (formula $Mg(BH_4)_2$). These compounds serve to obtain a high yield for the hydrogen generation reaction. Furthermore, the use of these borohydrides does not demand any particular safety measures, because they are harmless, that is, they are non-polluting and non-toxic.

To increase the yield of the hydrolysis reaction, a catalyst is introduced into the reactor 28 in the form of a salt dissolved in the water of the reaction. It is also possible to introduce the catalyst in the form of solid particles distributed in the hydride 22. The addition of catalysts directly to one of the reagents present avoids the separate introduction thereof into the reactor, automatically simplifying the use of the generator.

This catalyst may be selected from the group comprising ruthenium (Ru), platinum (Pt), cobalt (Co), palladium (Pd), nickel (Ni), iron (Fe), gold (Au), silver (Ag), manganese (Mn), rhenium (Re), rhodium (Rh), titanium (Ti), vanadium (V) and cerium (Ce).

Furthermore, the device according to the invention comprises means for releasing the water 24 required for the hydrolysis reaction, the means serving to convey the water 24 into the reactor 28. In the example in FIG. 2, the means consist of a line 21 for water intake 24 controlled by a valve not shown. This line 21 terminates, via an orifice 29 made in a wall of the reactor 28, in a line 23, of which one of the functions is to convey the water 24 to the seat of the hydrolysis reaction.

This line 23 is formed by a cylindrical envelope having a circular base. This cylindrical envelope serves to isolate the water 24 conveyed from the hydride 22 contained in the reactor 28, except at the seat provided for the hydrolysis reaction. In fact, by definition, the envelope or line 23 surrounds, covers and "protects" one of the reagents, in this case the water 24. The line 23 therefore has a hollow shape for containing and surrounding the hydride 22.

In the present case, the envelope forming the line 23 is made from aluminium. This metal is known to corrode in basic medium, which is the specific medium obtained by the hydride hydrolysis reaction. This is because the hydrolysis reaction produces hydroxide ion (OH$^-$). Thus the pH resulting from the hydrolysis reaction may reach a value of about 11.

When the aluminium is corroded and dissolves under the action of the hydroxide ions, this produces alumina as well as hydrogen, by the following reaction:

$$2Al + 6OH^- \rightarrow Al_2O_3 + 3H_2.$$

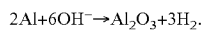

In consequence, this hydrogen production "side" reaction increases the total quantity of hydrogen produced in the reactor and commensurately improves the ratio of the hydrogen produced to the weight of the generator, a sort of "mass efficiency" of the reaction.

Furthermore, this reaction has the advantage of lowering the pH in the seat of the reaction by consuming the hydroxide ions, which would slow down the main hydride hydrolysis reaction. This consumption of hydroxide ions in the corrosion of the aluminium thus avoids the fluctuations in the production of hydrogen due to the lowering of the pH.

In the structure of the generator, this corrosion of the aluminium has the result of progressively consuming the envelope forming the line 23. Thus, according to one feature of the invention, this envelope releases the water 24 required for the hydrolysis, locally and progressively.

Firstly, this release of water 24 is "localized" because it only occurs at the end of 26 of the line 23, whereof the position in the reactor varies with the aluminium consumption previously described. In other words, the adjective "localized" designates a relatively restricted reaction exchange area, with regard in particular to the length of the envelope 23.

In practice, the location of the release of the water 24 varies within the reactor 28, but due to the consumption of the line, the release of the water 24 is always located in the zone where the hydrolysis reaction occurs, that is, as the hydride consumption proceeds. In consequence, and unlike the devices of the prior art, the line 23 cannot be obstructed by the products 25 issuing from the hydrolysis reaction, which sometimes have a compact consistency.

Secondly, this release of water 24 is progressive because it results from the progressive consumption of the envelope by the hydrolysis reaction products. The envelope is thus consumed as the production of hydroxide ions by the hydrolysis reaction advances. In consequence, its end 26 moves progressively with the seat of the reaction towards zones where the hydride 22 has not yet been hydrolyzed.

The envelope 23 is dimensioned to make its own consumption by corrosion match the hydrolysis of the hydride. As an example, a period of about 3 hours can be predicted for corroding half of the 50 μm thick walls of an aluminium tube.

Figure 3:
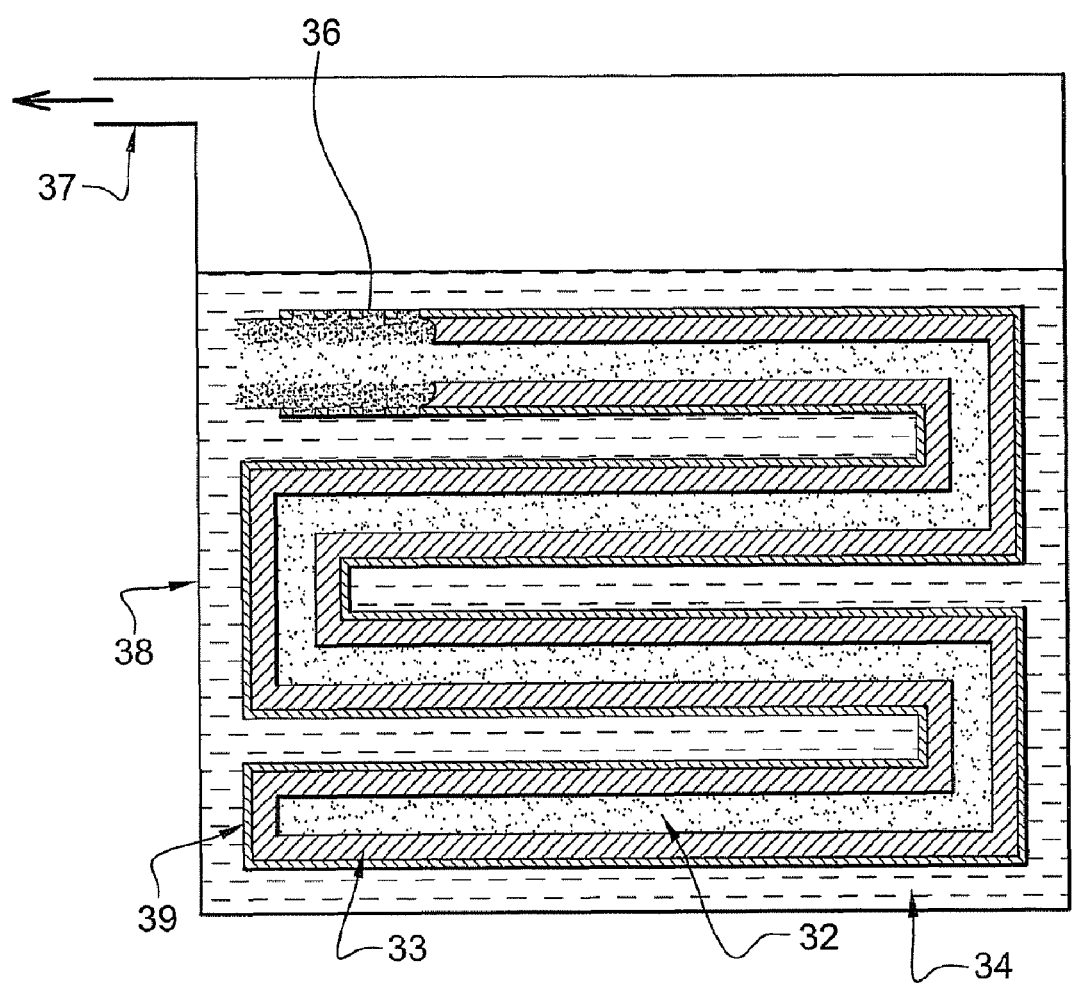
FIG. 3 is a schematic representation of a device according to a second embodiment of the invention.

FIG. 3 shows an alternative embodiment of the invention, in which the water is no longer conveyed from outside the reactor 38, but is directly contained in the reactor 38. As in the first embodiment, the water is isolated from the hydride 32 by an envelope 33, except locally at the seat provided for the initiation of the hydrolysis reaction. However, except for this uncovered portion, the hydride 32 is contained here in this envelope 33, contrary to the embodiment shown in FIGS. 2a to 2c.

As in the previous embodiment, the isolating envelope is made from aluminium. It corrodes progressively and locally, similar to the aluminium forming the line 23 as the hydrolysis reaction proceeds. In this embodiment, this line 33 has the form of a coil, in order to localize the seat of the hydrolysis reaction more effectively, as the reaction proceeds. The corrosion reaction of the aluminium forming the coil has the same characteristics and advantages as those described in connection with the preceding embodiment.

To localize this reaction at the desired site, here at one of the ends 36 of the coil, a lining 39 is deposited on most of the aluminium envelope 33. This lining 39 consists of a layer of a material that is inert to water. In the context of the present invention, inert means a material that does not react and remains unchanged in contact with the water; the lining is therefore insoluble in the water. This lining 39 thereby "protects" the envelope 33 from corrosion in the areas where it is deposited, by making it impervious. In consequence, at the start of the reaction, the envelope 33 corrodes locally and only at the end 36 where it is not covered by the lining 39 and where it does not cover the hydride 32. The immersed envelope 33 is therefore "protected" against premature dissolution, that is, more rapid than anticipated.

The envelope 33 is therefore mostly covered by the lining 39 and the overall combination is immersed in the water. When the envelope 33 comes into contact with the water 34, here at its end 36, the hydrolysis reaction takes place as previously described.

Contrary to the first embodiment described, in which the water intake is controlled, in this embodiment, the water is introduced entirely, thereby triggering the start of the hydrolysis reaction.

This reaction then continues in a manner controlled by the structure selected for the hydride, without stopping. However, to avoid the obstruction of the lining 39 by the compact products produced by this reaction, the lining 39 is formed of a sufficiently fine layer to make it dispersible in the water 34 in the absence of the solid support provided by the envelope 33. Thus, as the envelope 33 is corroded, the lining 39 losses its support and hence is dispersed in the water in small particles. These particles are not dissolved, because the material constituting the lining 39 is insoluble in water, as stated above. The thickness of the lining 39 therefore represents a compromise between the function of impermeabilizing the envelope 33 and the necessary dispersion of the lining 39 in the liquid contained in the reactor 38.

Thus, according to the invention, the water 34 comes into contact with the hydride locally and progressively, the progression resulting from the consumption of the material constituting the envelope 33 by the hydrolysis reaction products.

Once the hydrolysis reaction is initiated, it proceeds automatically by the disappearance of the envelope 33 and only stops when the lining or the hydride is completely consumed.

The envelope 33 here has the shape of a cylinder with a circular base, whereof the generating line is curved, in order to form a sort of "coil", thereby increasing the compactness of the device.

Furthermore and as in the first embodiment, it is advantageous to introduce a catalyst into the water 34 or into the hydride 32, in order to increase the yield of the hydrolysis reaction.

In the example in FIGS. 2a to 2c and 3, the envelopes forming the line 23 or the coil 33 have the shape of a cylinder with a circular base, but they could also be conical and/or have a polygonal cross section.

Furthermore, while a single envelope 23, 33 has been shown respectively in FIGS. 2a to 2c and 3, the device may comprise a plurality thereof, having similar or dissimilar geometries and distributed in the reactor. This serves to further improve the control of the reaction by increasing the number of controllable water intakes in the reactor. Similarly, a plurality of "coils" can be immersed in the reactor 38.

For these envelopes 23, 33, the choice of their number, geometries and positions in a particular reactor depends on the advancement of the desired hydrolysis reaction, as a function of the total hydrogen production time provided for this generator. Similarly, it is advantageous to select the quantities of hydride 22, 32 and water 24, 34 placed in the reactor 28, 38, in order to produce the predefined hydrogen flow rate during a desired period.

Thus, to obtain a uniform hydrogen flow rate, it is possible to prepare hydride coils that are elongated and have an orthogonal cross section and a constant surface area. As may be easily understood from the observation of the figures, in particular from the comparison between FIGS. 2b and 2c, the form of the hydride in its envelope serves as a support for the movement of the seat of the hydrolysis reaction. This is why this form is advantageously elongated, in order to obtain a progressive hydrolysis of the hydride.

The invention claimed is:

1. A device for generating hydrogen by hydrolysis of a hydride comprising:
   a reactor containing a hydride in solid form, in a divided state or not, and comprising at least one orifice for removing the hydrogen produced;
   means for releasing water required for the hydrolysis reaction; and
   at least one conduit suitable for isolating said hydride from the water required for the hydrolysis reaction, said conduit being made from a consumable material that is consumed as the hydride reacts with the water;
   wherein said conduit is suitable for contacting the water with said hydride in a site capable of serving as a seat of the hydrolysis reaction and of moving in said reactor as the consumable material constituting said conduit is consumed by hydrolysis reaction products.

2. A hydrogen generating device according to claim 1, wherein said hydride is selected from the group consisting of sodium tetrahydroborate $NaBH_4$, magnesium tetrahydroborate $Mg(BH_4)_2$, lithium tetrahydroborate $LiBH_4$, aluminium tetrahydroborate $Al(BH_4)_3$, beryllium tetrahydroborate $Be(BH_4)_2$, zirconium tetrahydroborate $Zr(BH_4)_3$, calcium tetrahydroborate $Ca(BH_4)_2$, potassium tetrahydroborate $KBH_4$, and the hydrides $LiH$, $MgH_2$, $CaH_2$, $Ca(AlH_4)_2$, $NaAlH_4$ and $LiAlH_4$.

3. A hydrogen generating device according to claim 1, wherein the material constituting said conduit is a metallic material that corrodes in the presence of a basic medium.

4. A hydrogen generating device according to claim 1, wherein the material constituting said conduit is an organic material that is degraded in the presence of a basic medium.

5. A hydrogen generating device according to claim 4, wherein the organic material is selected from the group consisting of polyamides, polycarbonates, PET (polyethylene terephthalate), polyesters, PVDF (polyvinylidene fluoride) and PBT (polybutyl terephthalate).

6. A hydrogen generating device according to claim 1, wherein the material constituting said conduit is a material whereof the dissolution under the action of the hydrolysis reaction products also produces hydrogen.

7. A hydrogen generating device according to claim 6, wherein said material is aluminium or an aluminium alloy.

8. A hydrogen generating device according to claim 1, wherein a catalyst material is introduced into said reactor in the form of a salt dissolved in the water or in the form of solid particles distributed in said hydride.

9. A hydrogen generating device according to claim 8, wherein said catalyst material is selected from the group consisting of cobalt (Co), ruthenium (Ru) and platinum (Pt), palladium (Pd), nickel (Ni), iron (Fe), gold (Au), silver (Ag), manganese (Mn), rhenium (Re), rhodium (Rh), titanium (Ti), vanadium (V) and cerium (Ce).

10. A hydrogen generating device according to claim 1, wherein the reactor further comprises at least one orifice that coincides with a line formed by said conduit to convey the water into said reactor.

11. A hydrogen generating device according to claim 1, wherein said reactor contains water, said conduit contains the hydride, wherein said conduit, before any use of the device, is mostly covered with a lining made from a material that is dispersible but not soluble in the water, and wherein the combination of said lining and the envelope said conduit is immersed in the water.

12. A hydrogen generating device according to claim 1, wherein said conduit has a shape of a cylinder or a cone, having a circular or polygonal base.

13. A hydrogen generating device according to claim 1, wherein said conduit has an elongated and hollow pipe shape.

14. A hydrogen generating device according to claim 1, further comprising a plurality of conduits having similar or dissimilar geometries and distributed in said reactor.

15. A fuel cell comprising an electrolyte, an anode and a cathode, wherein an oxidizer is oxygen ($O_2$), and a reducing agent is hydrogen ($H_2$) produced by hydrolysis, comprising a device for generating hydrogen by hydrolysis of a hydride according to claim 1.

* * * * *